United States Patent
Kondo

(10) Patent No.: US 6,405,426 B1
(45) Date of Patent: Jun. 18, 2002

(54) METHOD OF MANUFACTURING A STEPPED MAGNETIC HEAD SLIDER

(75) Inventor: Yasuyuki Kondo, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 132 days.

(21) Appl. No.: 09/591,575

(22) Filed: Jun. 9, 2000

Related U.S. Application Data

(62) Division of application No. 09/215,091, filed on Dec. 18, 1998, now abandoned.

(30) Foreign Application Priority Data

Jan. 5, 1998 (JP) .......................................... 10-000264

(51) Int. Cl.⁷ .................................................. G11B 5/42
(52) U.S. Cl. ............................... 29/603.12; 360/235.5; 360/235.9
(58) Field of Search .................... 29/603.12; 360/235.5, 360/235.9, 235.6–235.8

(56) References Cited

U.S. PATENT DOCUMENTS

| | | |
|---|---|---|
| 4,939,603 A | 7/1990 | Inumochi |
| 5,872,686 A | 2/1999 | Dorius et al. |
| 6,040,959 A | 3/2000 | Kobayashi et al. |
| 6,069,770 A | 5/2000 | Cui et al. |

FOREIGN PATENT DOCUMENTS

| | | |
|---|---|---|
| JP | 2-180754 | 7/1990 |
| JP | 3-149184 | 6/1991 |
| JP | 5-28685 | 2/1993 |
| JP | 5-174343 | 7/1993 |

*Primary Examiner*—Carl E. Hall
(74) *Attorney, Agent, or Firm*—Brinks Hofer Gilson & Lione

(57) ABSTRACT

A first step portion is formed at a portion at which on an outer end portion of a facing surface of a surface of the slider meets the side panel of the slider. Furthermore, a second step portion is formed at the portion at which the outer end portion of the first step portion meets the side panel of the slider. An edge or the like due to machining occurs at an outer end portion of the second step portion. However, even if the magnetic head is steeply inclined, the outer end portion of the second step portion in which the edge or the like due to machining occurs is barely brought into contact with the recording medium because of the formation of the second step portion.

7 Claims, 5 Drawing Sheets

DAMAGE LEVEL

0 : NOT VARIED
1 : NOT MORE THAN 10μm
2 : NOT MORE THAN 30μm
3 : NOT MORE THAN 100μm
4 : NOT LESS THAN 100μm

METHOD OF MANUFACTURING A STEPPED MAGNETIC HEAD SLIDER

This application is a divisional application of Ser. No. 09/215,091, filed Dec. 18, 1998, now abandoned.

BACKGROUND OF THE INVENTION

1. Field of the Invention

The present invention relates to a magnetic head having a slider mounted on a hard disk apparatus or the like. In particular, the present invention relates to a magnetic head with reduced the likelihood of damaging a recording medium due to movement relative to an edge or the like formed by machining on the slider.

2. Description of the Related Art

FIG. 7 is an isometric view of a conventional magnetic head mounted on a hard disk or the like, showing the facing surface facing a recording medium. In this magnetic head, an upstream side A and a downstream side B are respectively called a leading side and a trailing side with respect to the direction of movement of the recording medium. Reference numeral 20 in FIG. 7 designates a slider made of a ceramic material or the like. A thin-film device 6 for magnetic recording and/or playing back is provided on the end portion of the trailing side B of the slider 20.

As shown in FIG. 7, an air groove 2 is provided on a portion facing a recording medium of the slider 20, and a facing surface 21 (a flying surface, that is, an air bearing surface (hereinafter referred to as an ABS)) is formed around the air groove 2. Furthermore, a step portion 22 is formed at the portion of the outer end portion of the facing surface 21 which meets the side panel of the slider 20. The depth of the step portion 22 and the depth of the air groove 2 are almost equal. Furthermore, an inclined surface 5 is provided at the leading side A of the facing surface 21.

Next, a method for manufacturing the slider 20 shown in FIG. 7 will be described. As shown in FIG. 8, a plurality of resist layers 23 for defining the facing surface 21 facing the recording medium is provided on a surface of a substrate made of a ceramic material as a base material of the slider 20. Then, as shown in FIG. 9, parts of the surface of the substrate not covered with the resist layers 23 are etched off using an ion milling system and then the resist layers 23 are removed.

At this point, a plurality of facing surfaces 21 is formed on the surface of the substrate. Next, as shown in FIG. 10, the substrate is cut off between the facing surfaces 21 adjacent to each other, so that a plurality of sliders 20 having a configuration as shown in FIG. 7 is obtained simultaneously. The slider 20 of the magnetic head is supported by a flexure (not shown) immobilized at a top of a load beam (not shown), and is urged toward the recording medium by elastic force of the load beam applied by a leaf spring.

This magnetic head is used for a hard disk apparatus which employs a contact-stand-and-stop (hereinafter referred to as a CSS) system or a ramp load system. In a flying state, the magnetic head is inclined in such a manner that the leading side A is higher than the trailing side B on the recording medium. In the flying state, a recording signal is written on the recording medium by the thin-film device 6 shown in FIG. 7, or a magnetic signal is detected from the recording medium.

As described above, the slider 20 of the magnetic head shown in FIG. 7 is manufactured as follows. The facing surface 21 facing the recording medium is formed on a substrate, which is the base material for the slider 20 using a photolithography technique. Then, the substrate is cut off to produce the slider 20 shown in FIG. 7 (with reference to FIGS. 8 to 10). Since the cutting off step is conducted by machining, an edge, a burr or the like easily occurs at an end portion which is cut off by machining, that is, the end portion being an outer end portion 22a of the step portion 22 shown in FIG. 7.

When the edge or the like occurs at the outer end portion 22a of the step portion 22, the surface of the recording medium is damaged due to movement relative to the edge or the like while the slider 20 is steeply inclined and brought into contact with the recording medium, due to a strong shock from the outside or the like.

When the magnetic head is dropped on the surface of the recording medium from an arm mounted within the apparatus in the ramp load system, the edge or the like formed on the slider 20 by machining gives rise to a problem in which damage occurs to the surface of the recording medium when the slider 20 of the magnetic head is steeply inclined and brought into contact with the recording medium.

Furthermore, when the outer end portion 22a of the step portion 22, in which the edge or the like occurs, is brought into contact with the recording medium, cracking occurs easily at the outer end portion 22a having the edge or the like due to machining, so that a problem is created in which the magnetic head is also easily damaged.

SUMMARY OF THE INVENTION

It is an object of the present invention to overcome the above disadvantages, and to provide a magnetic head and a method of manufacture therefor in which an improvement in a configuration of a slider makes it possible to reduce the likelihood of damaging a recording medium due to movement relative to an edge or the like formed on a slider by machining in a ramp load system or when a strong shock is received from the outside.

According to one aspect of the present invention, there is provided a magnetic head including a slider; a thin-film device for at least one of storing and playing back a magnetic record provided at an end portion of a trailing side of the slider; a first step portion provided at a region from an outer end portion of a facing surface facing a recording medium provided on the slider to a side panel of the slider; and a second step portion provided at the side panel of the slider.

In accordance with the present invention, the second step portion may be formed by machining. Furthermore, in accordance with the present invention, an angle θ defined by a line connecting the outer end portion of the first step portion with an outer end portion of the second step portion and the facing surface of the recording medium preferably ranges from 45 to 90 degrees.

In addition, the second step portion may be provided at an end portion of a leading side of the slider.

Furthermore, in accordance with the present invention, the outer end portion of the first step portion preferably has a rounded configuration., Furthermore, at least one of a corner portion of the end portion of the leading side and a side panel of the slider and a corner portion of the end portion of the trailing side and a side panel of the slider is preferably shaved, and more preferably has a rounded configuration.

According to another aspect of the present invention, there is provided a method for manufacturing a magnetic head having a slider and a thin-film device for at least one of storing and playing back a magnetic record provided at an end portion of a trailing side of the slider, including the steps of providing a groove portion on a substrate as a base material for a slider by machining; providing a resist layer which defines a facing surface facing a recording medium between the groove portions on a surface of the substrate; forming a first step portion at a region from the facing surface to the groove portion by etching a surface area not covered with the resist layer, using an ion milling system; and cutting off the substrate at the groove portion so that a second step portion is formed starting from an outer end portion of the first step portion.

An edge or the like due to machining occurs at an end portion of the step portion of a conventional magnetic head shown in FIG. 7. Thus, there is a problem in which damage due to the edge or the like occurs on a surface of a recording medium when a slider is steeply inclined.

In accordance with the present invention, a deeper step portion (a second step portion) is provided by machining at a region from the step portion shown in FIG. 7. FIG. 1 shows a specific configuration of a magnetic head in accordance with the present invention.

As shown in FIG. 1, a first step portion (the same as the step portion shown in FIG. 7) and the second step portion are provided at a side panel of the slider. In accordance with the present invention, the edge or the like due to machining occurs only at an outer end portion of the second step portion, and the edge or the like due to machining does not occur at an outer end portion of the first step portion.

In addition, an angle of inclination θ (with reference to FIG. 3) of the second step portion is preferably maximally obtuse. In accordance with the present invention, the angle of inclination θ preferably ranges from 45 to 90 degrees.

In a method for manufacturing the slider in accordance with the present invention, in particular, a deep groove is preliminarily provided on a substrate as a base material for the slider (with reference to FIG. 4).

Then as shown in FIG. 5, the first step portion is provided on the substrate using a photolithography technique, so that an edge, a burr, or the like is unlikely to be produced at the outer end portion of the first step portion.

Furthermore, in accordance with the present invention, as shown by the dashed-dotted line in FIG. 5, the substrate is cut off at the grooves, so that the edge or the like due to machining occurs only at the outer end portion of the second step portion (with reference to FIG. 1).

Thus, in accordance with the present invention, the first step portion is provided at the side panel of the slider using a photolithography technique, then the second step portion is provided by machining at a region from the outer end portion of the first step portion. An edge or the like due to machining occurs only at the outer end portion of the second step portion.

Therefore, in accordance with the present invention, when the outer end portion of the second step portion in which the edge or the like occurs is brought into contact with the recording medium, the angle of inclination of the magnetic head can be steeper than in the conventional art.

That is, in accordance with the present invention, even if a magnetic head is steeply inclined and brought into contact with a recording medium due to a strong shock from the outside, the recording medium can be maximally protected from coming into contact with the outer end portion of the second step portion in which the edge or the like occurs.

As a result, the likelihood of damaging the recording medium due to movement relative to an edge or the like formed by machining can be reduced.

DESCRIPTION OF THE PREFERRED EMBODIMENT

In accordance with the present invention, there is provided a first step portion starting from an outer end portion of a facing surface formed on a surface of a slider toward a side panel of the slider using a photolithography technique. Then, a second step portion is provided from the outer end portion of the first step portion toward the side panel of the slider by machining. An edge or the like due to machining occurs only on the outer end portion of the second step portion.

Therefore, even if a magnetic head is steeply inclined and brought into contact with a recording medium due to a shock from the outside, the recording medium can be maximally protected from coming into contact with the outer end portion of the second step portion in which the edge or the like occurs. As a result, the likelihood of damaging the recording medium due to movement relative to an edge or the like formed by machining can be reduced compared with the conventional art.

Furthermore, in accordance with the present invention, an angle of inclination of the second step portion is preferably maximally obtuse in order to protect the recording medium from being damaged.

In addition, in order to provide the second step portion on the side panel of the slider, a groove portion is preliminarily formed on a substrate, which is a base material for the slider, by machining. Then, after a first step portion is formed using the photolithography technique, the substrate is cut off at the groove portion. Thus, the first and the second step portions are formed on a side panel of the constructed slider.

Figure 1:
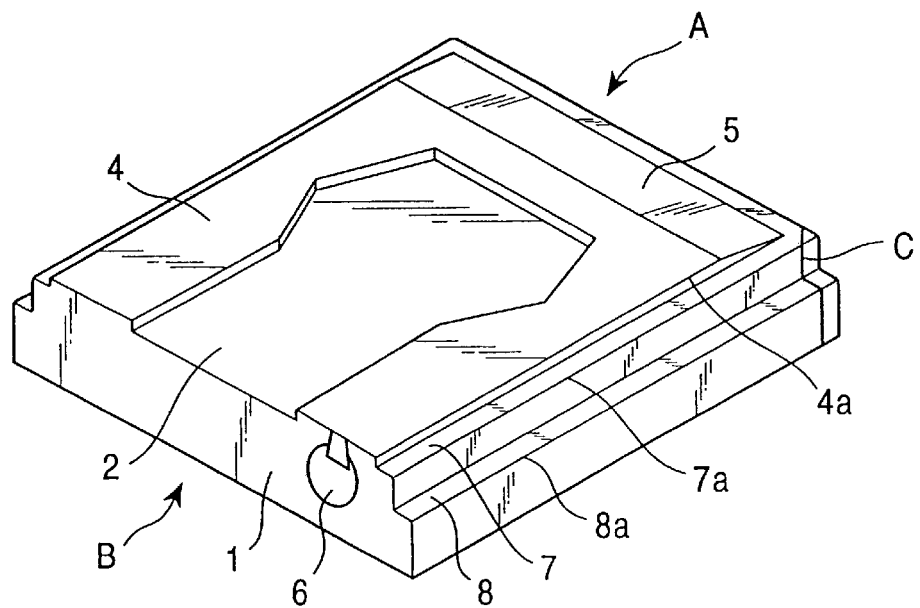
FIG. 1 is an isometric view of a magnetic head mounted on a hard disk or the like according to a first embodiment of the present invention, showing the facing surface facing a recording medium.
Figure 2:
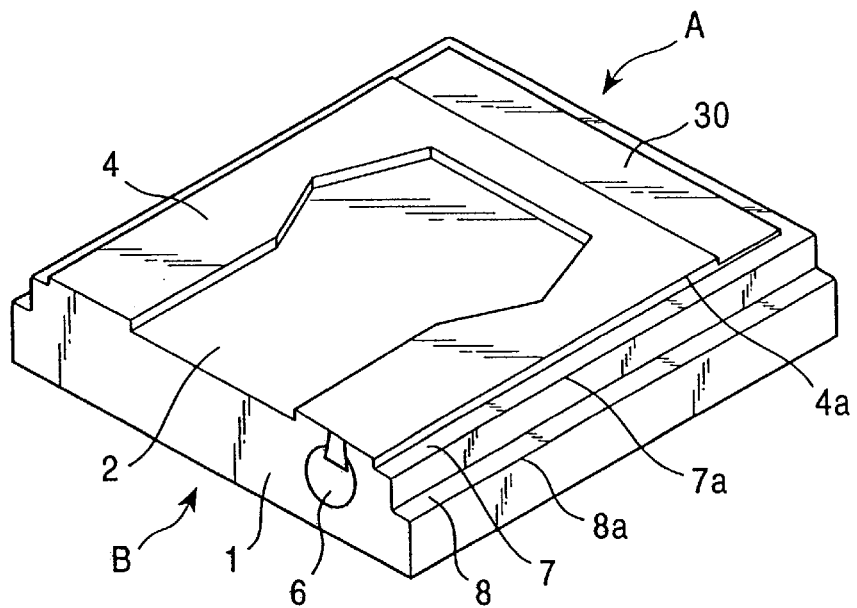
FIG. 2 is an isometric view of a magnetic head mounted on a hard disk or the like according to a second embodiment of the present invention, showing the facing surface facing a recording medium.
Figure 3:
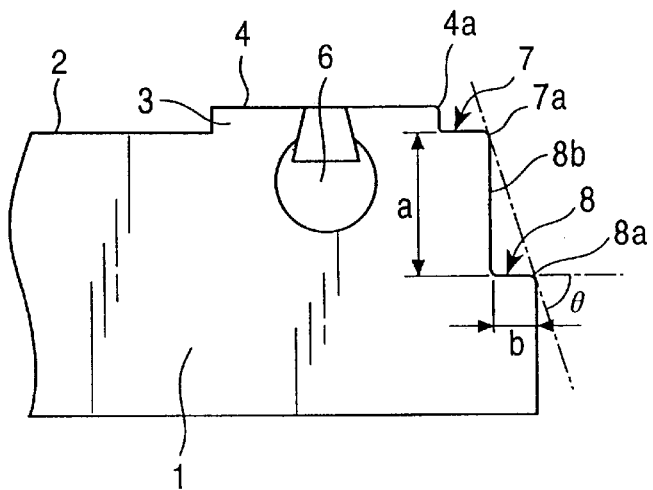
FIG. 3 is a partial front view showing the right part of the front of the magnetic head according to FIGS. 1 and 2.

FIG. 1 is an isometric view of a magnetic head mounted on a hard disk or the like according to a first embodiment of the present invention, showing the facing surface facing a recording medium; FIG. 2 is an isometric view of a magnetic head mounted on a hard disk or the like according to a second embodiment of the present invention, showing the facing surface facing a recording medium; and FIG. 3 is a partial front view showing the right part of the front of the magnetic head according to FIGS. 1 and 2.

A slider 1 of the magnetic head shown in FIGS. 1 and 2 is made of a ceramic material such as alumina-titanium carbide, or silicon (Si). An air groove 2 is provided on a facing surface 4 facing a recording medium, and a rail portion 3 is provided on three sides of the air groove 2.

The surface of the rail portion 3 is the facing surface 4 facing the recording medium (a flying surface, that is, an ABS). As shown in FIG. 1, an inclined surface 5 is provided at a leading side A of the rail portion 3, or as shown in FIG. 2, a step portion 30 may be provided instead of the inclined surface 5. The configuration of the rail portion 3 in accordance with the present invention is not limited to the configurations shown in FIGS. 1 and 2.

According to FIGS. 1 and 2, the rail portion 3 which is divided into two parts at a trailing side B is connected with each other at the leading side A. The leading portion 3 is, however, completely divided into two parts from the trailing side B to the leading side A. In addition, the facing surface 4 may have a crown shape. As shown in FIG. 1, a thin-film device 6 is provided on the end surface (end portion) of the trailing side B of the slider 1. The thin-film device 6 is covered with a protective film (not shown) made of a ceramic material such as alumina ($Al_2O_3$).

The thin-film device 6 has a multilayer structure laminated with a magnetic material such as permalloy (Ni—Fe-based alloy), an insulating material such as alumina, and the like. Furthermore, the thin-film device 6 includes a detecting region for a magnetic signal which can be played back from a magnetically recorded signal on a disk, or a recording region for recording a magnetic signal on a disk, or both. The recording region using a magnetic signal is, for example, a magnetoresisitive effect head having a magnetoresisitance effect device (hereinafter referred to as an MR device). The detecting region for a magnetic signal includes an inductive head which has a pattern formation made of a coil and a core.

Next, a configuration of a side of the slider 1 will be described below. As shown in FIGS. 1 and 2, a first step portion 7 is formed at the portion at which an outer end portion 4a of the facing surface 4 meets a side panel of the slider 1. The first step portion 7 is formed using a photolithography technique as described below, so that an edge or a burr due to machining rarely occurs at an outer end portion 7a of the first step 7.

Then, the outer end portion 4a of the facing surface 4 is covered with a resist and the step portion 7 is etched by an ion milling method, so that a perpendicular edge is formed and flying properties are stable. In addition, the outer end portion 7a of the first step portion 7 has preferably a rounded configuration, and the outer end portion 4a of the facing surface 4 preferably stands perpendicularly.

According to the embodiment of the magnetic head shown in FIG. 1, although the first step portion 7 is provided not only at the side panel of the facing surface 4 but also at the region from the end of the inclined surface 5 to the end portion of the leading side A, the inclined surface 5 may be provided to the end of the leading side A and the first step portion 7 is only provided at the side regions of the facing surface 4.

Additionally, in accordance with the present invention, as shown in FIGS. 1 to 3, a second step portion 8 is provided at a region from the outer end portion 7a of the first step portion 7 to the side panel of the slider 1. In this case, an inner surface 8b of the second step portion 8 may be perpendicular to the facing surface 4 or may be inclined to the perpendicular surface.

Figure 7:
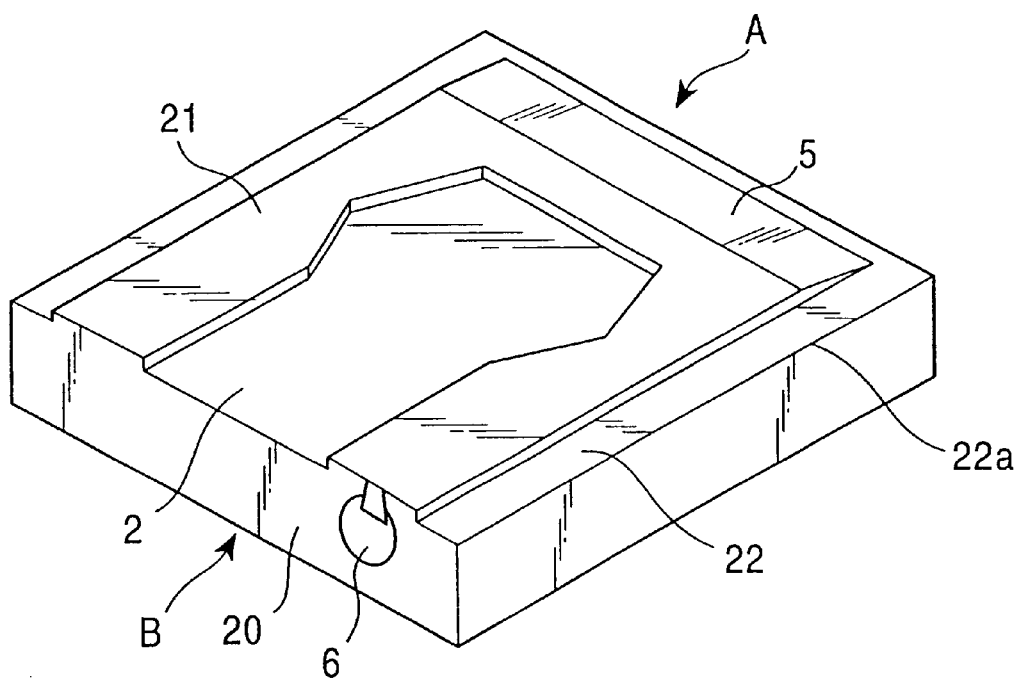
FIG. 7 is an isometric view of a conventional magnetic head mounted on a hard disk or the like, showing the facing surface facing a recording medium.
Figure 8:
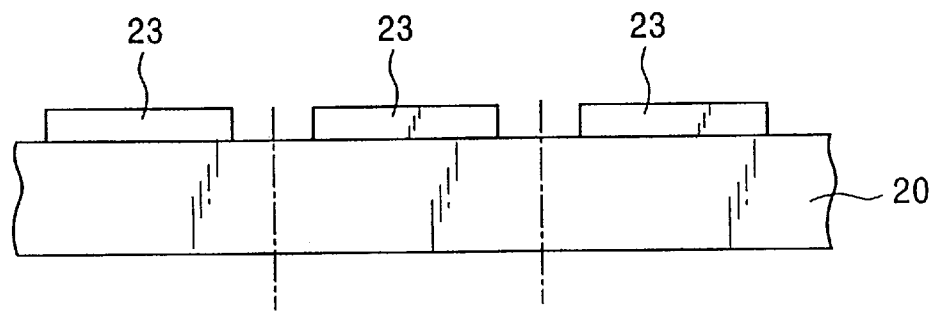
FIG. 8 shows one step of a process for manufacturing the conventional magnetic head.
Figure 9:
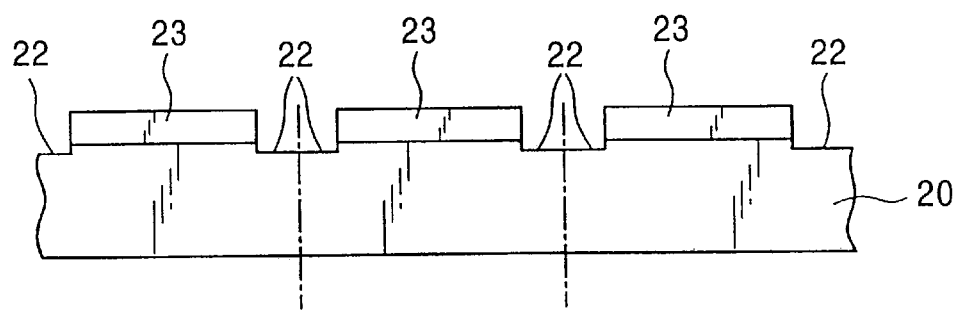
FIG. 9 shows another step of a process for manufacturing the conventional magnetic head.
Figure 10:
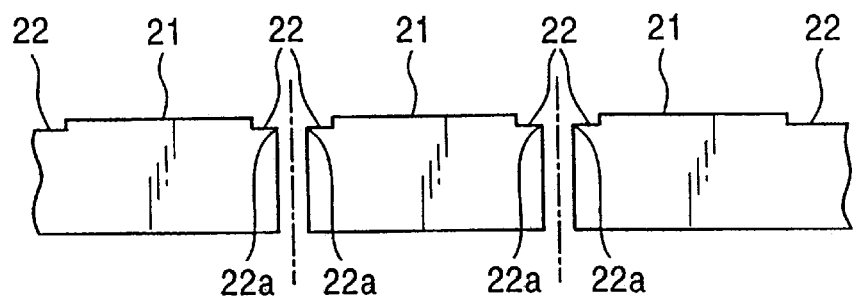
FIG. 10 shows still another step of a process for manufacturing the conventional magnetic head.

In addition, an edge, a burr or the like may occur at an outer end portion 8a of the second step portion 8 due to machining in the same way as at an outer end portion 22a of a step portion 22 in a conventional magnetic head (with reference to FIG. 7). In accordance with the present invention, a depth a of the second step portion 8 is preferably as large as possible and a width b thereof is preferably as narrow as possible, so as to preferably make an angle of inclination $\theta$ as obtuse as possible. The preferred range of the angle of inclination $\theta$ is from 45 to 90 degrees. In accordance with the present invention, since the second step portion 8 is formed by machining, the depth a and the width b of the second step portion 8 can be easily formed so as to have a predetermined depth and a predetermined width.

In accordance with the present invention, the second step portion 8 is provided at the side panel of the slider 1; in particular, the depth a of the second step portion 8 is made to be larger and the width b of the second step portion 8 is made to be narrower so as to make the angle of inclination $\theta$ as obtuse as possible. Thus, the recording medium can be maximally protected from making contact with the outer end portion 8a of the second step portion 8, even if the recording medium is steeply inclined. Therefore, the likelihood of damaging a recording medium due to movement relative to the edge or the like caused by machining can be reduced compared with the conventional art.

Furthermore, in accordance with the present invention, as shown in FIGS. 1 and 2, although the second step portion 8 is formed only at the side panel of the slider 1, the portion 8 may be provided also on the end panel of the leading side A.

Furthermore, in accordance with the present invention, a crossing portion of the side panel of the slider 1 and the end panel of the leading side A and/or a crossing portion of the side panel of the slider 1 and the end panel of the trailing side B is preferably shaved, and more preferably has a rounded configuration. For example, according to FIG. 1, when the crossing portion of the right side of the slider 1 and the end panel of the leading side A is shaved along the solid line c and the remaining three crossing portions are also shaved, damage to the recording medium is further avoided.

Figure 4:
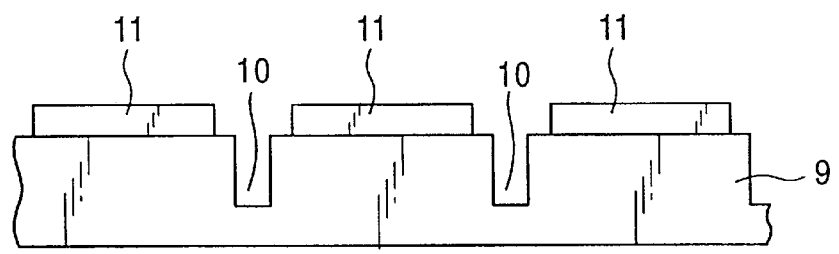
FIG. 4 shows one step of a process for manufacturing a magnetic head in accordance with the present invention.

Next, referring to FIGS. 4 and 5, a method for manufacturing the slider 1 in accordance with the present invention will be described below. First as shown in FIG. 4, a groove portion 10 is preliminarily formed by machining on a substrate 9 for the slider 1 made of a base material such as titanium carbide. The groove portion 10 will become the second step portion 8 of the slider 1 (with reference to FIGS. 1 to 3).

Furthermore as shown in FIG. 4, resist layers 11 (with reference to FIGS. 1 to 3) are formed to define the rail portion 3 on the substrate 9 between the abutting groove portions 10. Then, parts of the surfaces of the substrate 9 which are not covered with the resist layers 11 are etched off using an ion milling system so as to form the first step portion 7. In addition, the ion milling system is performed while the substrate 9 is rotating, so that the outer end portion 7a of the first step portion 7 easily has a rounded configuration. On the other hand, since the outer end 4a of the facing surface 4 is covered with the resist layer 11, the edge becomes perpendicular.

Figure 5:
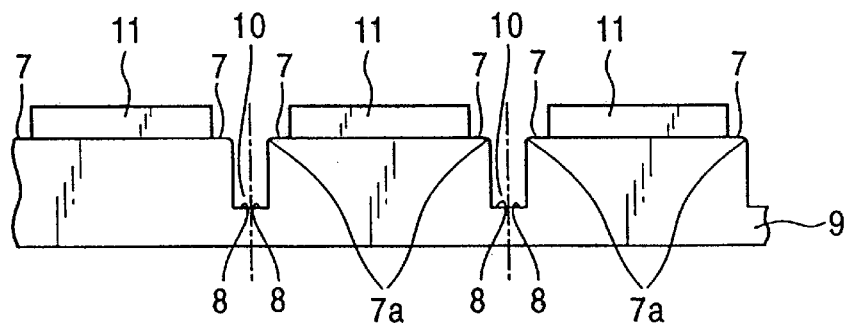
FIG. 5 shows another step of a process for manufacturing the magnetic head in accordance with the present invention.

Next, as shown by the dashed-dotted line in FIG. 5, the substrate 9 is cut off at the groove portions 10 by machining and each slider 1 is obtained. The second step portion 8 is formed at the region from the outer end portion 7a of the first step portion 7 to the side panel of the slider 1 by cutting off the substrate 9 at the groove portions 10. The edge, the burr or the like due to machining easily occurs at the outer end portion 8a of the second step portion 8.

In accordance with the present invention, the edge or the like by machining occurs only at the outer end portion 8a of the second step portion 8 and does not occur at the outer end portion 7a of the first step portion 7 which is easily brought into contact with the recording medium.

In accordance with the present invention as described above in detail, the first step portion 7 is provided at the region from the outer end portion 4a of the facing surface 4 of the slider 1 to the side panel of the slider 1, and the second step portion 8 is provided at the region from the outer end portion 7a of the first step portion 7 to the side panel of the slider 1. The edge, the burr or the like due to machining easily occurs at, the outer end portion 8a of the second step portion 8. However, in accordance with the present invention, although the magnetic head is steeply inclined due to a strong shock from the outside and is brought into contact with the magnetic head, the outer end portion 8a of the second step portion 8 can be maximally protected from making contact with the recording medium. Thus, the likelihood of damaging the recording medium can be reduced compared with the conventional art.

The slider 1 was prepared in which the first step portion 7 and the second step portion 8 were formed on the side panels as shown in FIG. 1, and the slider 20 in which only one step portion 22 was formed on the side panels. Then, when each slider was dropped on the recording medium, lengths of cracks which occurred on each slider were measured. In the experiment, the angle of inclination θ of the second step portion 8 of the slider 1 shown in FIG. 1 was about 76 degrees (with reference to FIG. 2).

In the experiment, four sliders 1, as shown in FIG. 1, and four sliders, as shown in FIG. 20, were prepared. Then, each slider was dropped on the recording medium. The lengths of the cracks were measured after the end of the fifth drop for each slider. The measured area of the crack was the outer end portion 7a of the first step 7 with respect to the slider 1 shown in FIG. 1. With respect to the slider 20 shown in FIG. 7, the measured area thereof was the end portion 22a of the step portion 22 in which the edge or the like occurred due to machining.

Figure 6:
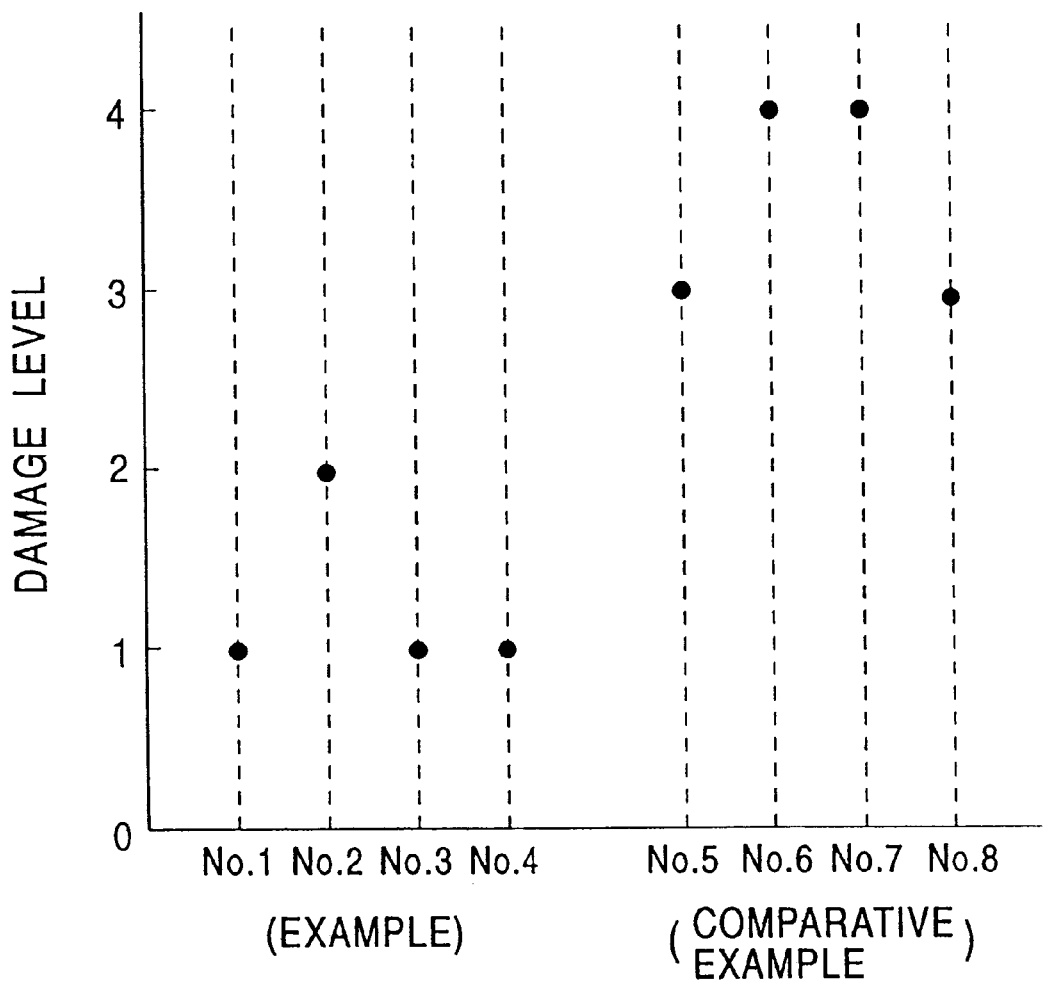
FIG. 6 shows the results of measuring the lengths of cracks which occurred on sliders after dropping a plurality of sliders on a recording medium.

The experimental results are shown in FIG. 6. In FIG. 6, the values of Nos. 1 to 4 were the data when the slider 1 shown in FIG. 1 was used (Examples). The values of Nos. 5 to 8 were the data when the slider 20 shown in FIG. 7 was used (Comparative Examples). According to FIG. 6, it is clearly seen that the lengths of the cracks which occurred on the magnetic head of Nos. 1 to 4 were shorter than those which occurred on the magnetic head of Nos. 5 to 8. The reason is as follows. With respect to the magnetic heads of Nos. 1 to 4, the second step portions 8 are provided on the side panel of the slider 1 as shown in FIG. 1, so that the outer end portions 7a of the first step portions 7 are brought into contact with the recording medium even though the sliders 1 were steeply inclined. Then, since the edge or the like due to machining does not occur on the outer portion 7a, the occurrence of cracks can be maximally avoided.

What is claimed is:

1. A method for manufacturing a magnetic head having a slider and a thin-film device, said slider having an air groove and a facing surface facing a recording medium, said thin-film device for at least one of storing and playing back a magnetic record on said recording medium, said thin-film device being provided at an end portion of a trailing side of said slider, said method comprising the steps of:

forming a groove portion on a substrate that serves as a base material for said slider, said groove portion being formed by machining;

providing a resist layer which defines the facing surface of said slider adjacent said groove portion on a surface of said substrate;

forming a first step portion at a region from said facing surface to said groove portion by etching a surface area not covered with said resist layer, said etching accomplished by using an ion milling system; and cutting said substrate at said groove portion so that a second step portion is formed adjacent to an outer end portion of said first step portion.

2. A method for manufacturing a magnetic head according to claim 1, wherein said second step portion is formed by machining.

3. A method for manufacturing a magnetic head according to claim 1, wherein an angle θ defined by a first plane of said facing surface and a second plane containing an outer edge of said first step portion and an outer edge of said second step portion ranges from 45 to 90 degrees.

4. A method for manufacturing a magnetic head according to claim 1, wherein said second step portion is provided at an end portion of a leading side of said slider.

5. A method for manufacturing a magnetic head according to claim 1, wherein said outer end portion of said first step portion has a rounded configuration.

6. A method for manufacturing a magnetic head according to claim 1, wherein at least one of a corner portion of said end portion of a leading side and a side panel of said slider and a corner portion of said end portion of said trailing side and said side panel of said slider is shaved.

7. A method for manufacturing a magnetic head according to claim 6, wherein said corner portion has a rounded configuration.

* * * * *